June 25, 1957  E. W. WILKINS  2,796,754
POWER-DRIVEN WRINGING MACHINES
Filed Feb. 18, 1955  3 Sheets-Sheet 1

FIG. I.

Inventor
Edward W. Wilkins
Scrivener + Parker,
attorneys

June 25, 1957 E. W. WILKINS 2,796,754
POWER-DRIVEN WRINGING MACHINES
Filed Feb. 18, 1955 3 Sheets-Sheet 3

United States Patent Office 2,796,754
Patented June 25, 1957

2,796,754

POWER-DRIVEN WRINGING MACHINES

Edward W. Wilkins, Tettenhall, Wolverhampton, England, assignor to Wilkins & Mitchell Limited, The Green, Darlaston, England Application February 18, 1955, Serial No. 489,124

Claims priority, application Great Britain March 20, 1954

2 Claims. (Cl. 68—255)

This invention relates to wringing machines used in conjunction with clothes washing machines and of the type in which one of a pair of wringing rollers is power driven through reversing bevel gear comprising a pair of confronting and axially aligned bevel wheels drivingly coupled to said roller and an intermediate bevel pinion on the upper end of a driving vertical shaft which is journalled in a carrier, which driving shaft carrier is guided in a carrier housing for movement endwise of the wringing machine so as to rock said vertical shaft and bring its bevel pinion into mesh with either of said bevel wheels according to the direction of roller drive required.

In machines of this type as hitherto constructed, the carrier housing, which is attached to the bottom of the wringing machine is angularly adjustable about a vertical axis on the washing machine, so that the wringer, as a whole, can be turned into various angular positions in relation to said washing machine, means being provided for locking the housing in its different angular positions.

The adjustment of the position of the driving shaft carrier in its housing to reverse the drive, in one such machine, has been effected by a screw engaged with the carrier by a T-joint and passing through a nut located in the wall of the housing, the nut being turned to move the carrier, but this provision for adjustment is slow in operation.

In another machine of the type referred to, the driving shaft carrier has a transverse slot which is engaged by the cranked upper end of a vertical spindle which is journalled in the carrier housing and turned by a handle so as to cause said cranked upper end to adjust the position of the carrier to bring the bevel pinion into mesh with one or other of the bevel wheels associated with one of the wringer rollers. When the pinion is in the disengaged or "neutral gear" position, the vertical spindle is permitted a limited vertical movement sufficient to enable its lower end to be engaged in and disengaged from any of a number of locating holes in a surface on the washing machine and in relation to which the housing is turnably mounted. With this arrangement the spindle serves the dual purpose of operating the reversing gear and locking the wringing machine in its various angular positions, but this has the disadvantage that if, inadvertently, an attempt is made to alter the angular setting of the wringing machine without first moving the pinion into neutral and disengaging the spindle from the locating hole, the upper cranked end of the spindle may be bent. If this occurs, the throw of the cranked upper end of the spindle will be altered so that it will not operate to bring the bevel pinion into correct mesh with either of the bevel wheels.

A power-driven wringing machine of the type referred to and according to the present invention is characterised in that the driving shaft carrier is provided with a transverse bearing for the cranked centre portion of a horizontally disposed actuating spindle, both ends of which are mounted in bearings in the carrier housing. Preferably both ends of the actuating spindle are provided with handles.

According to a further preferred feature of the invention spring-loaded arms co-operate with the cranked centre portion of the actuating spindle so as to locate it in a central "neutral gear" position, and also to maintain said cranked portion in each of its two "gear engaged" positions, said spring-loaded arms operating to assist turning movement of the spindle from the central position to either of the latter positions once such movement has been initiated.

Separate means would be provided for locking the wringing machine in its various angular positions in relation to the washing machine surface upon which the housing is turnably mounted, said locking means preferably comprising a vertical spring-loaded plunger mounted to slide in a bearing in said housing and to engage any of a number of locating holes in said surface. In this connection the arrangement is preferably such that the carrier obstructs the plunger against disengagement from any of said locating holes except when said carrier is in the "neutral gear" position.

The invention will now be further described with reference to the accompanying drawings, in which.

Figure 1:
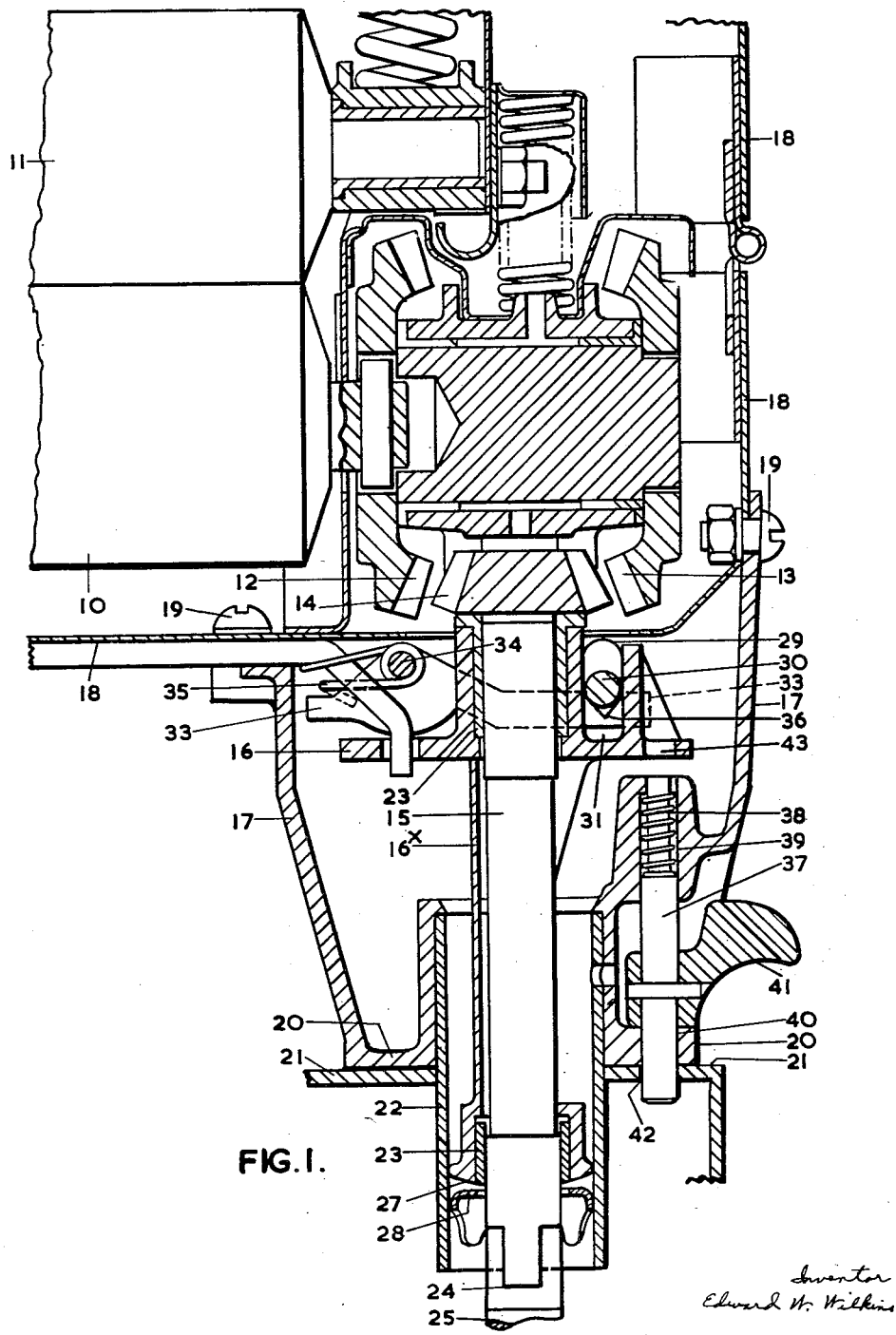
Fig. 1 is a fragmentary sectional front elevation, showing the relevant mechanism of a power-driven wringing machine with the invention incorporated therein.
Figure 2:
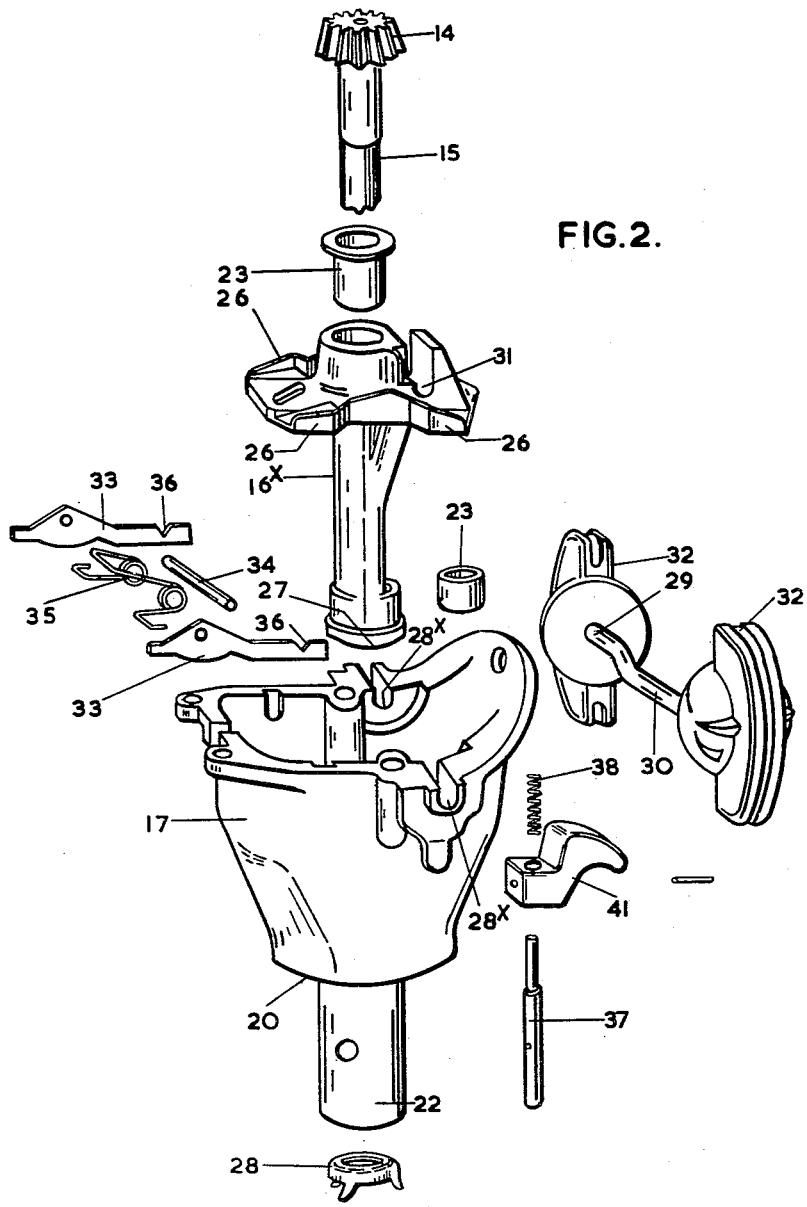
Fig. 2 is an "exploded" perspective view of the mechanism incorporating the invention.
Figure 3:
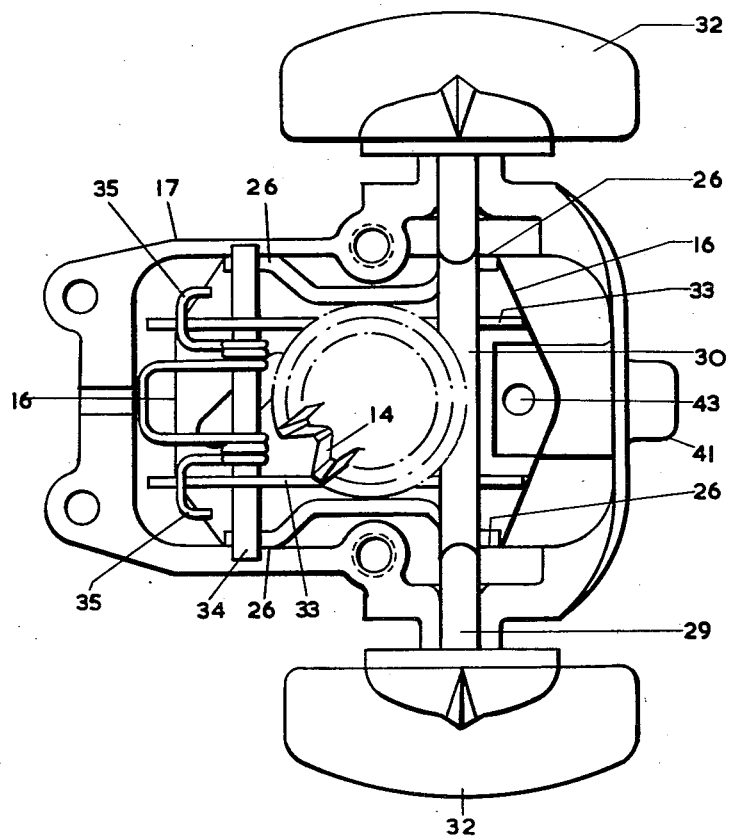
Fig. 3 is a plan view of the mechanism shown in Fig. 2 in assembled condition.

Referring to the drawings, the driven roller 10 (Fig. 1) of a pair of wringing rollers 10, 11 is rotated through reversing bevel gear comprising a pair of confronting coaxial bevel wheels 12, 13, both drivably coupled with said roller 10, and an intermediate bevel pinion 14 on the upper end of a vertically disposed driving shaft 15. The driving shaft 15 is journalled in a driving shaft carrier, indicated generally by the reference numeral 16, and described in detail below.

A housing 17 for the carrier 16 is secured to the bottom and at one end of the case 18 of the wringing machine by screws 19, and is formed with a flange base 20 which rests and turns upon a horizontal surface 21 of a washing machine to which the wringer is attached. A tubular downward extension 22 of the carrier housing 17 passes through a bearing hole in the surface 21, so that the wringer can pivot about the axis of said tubular extension 22 and be swung horizontally to various angular positions in relation to the washing machine.

The shaft 15 is journalled in the carrier 16 by means of end bearing sleeves 23, and said shaft 15 is coupled by a universal joint, indicated at 24, to a motor shaft 25.

The driving shaft carrier 16 has bearing surfaces 26 whereby it is guided for movement in the housing 17 in direction endwise of the wringer rollers 10, 11, so as to bring the bevel pinion 14 into mesh with either of the bevel wheels 12, 13, or out of mesh with both in a neutral position which is illustrated in Fig. 1. The carrier 16 has a depending portion 16× in the form of a part sleeve which extends down into the tubular extension 22 of the housing 17, said sleeve 16× supporting the bottom bearing sleeve 23 for the shaft 15, and having an arcuate base at 27 which bears on a ring-like pressing 28 fixed in the tubular extension 22.

Mounted in bearings 28× in opposite sides of the housing 17 is a horizontal actuating spindle 29 having an offset or cranked centre portion 30 which engages in a U-shaped transverse bearing 31 on the upper face of the carrier 16, the projecting ends of said spindle 29 being fitted with handles 32 whereby it can be turned to cause the crank 30 to throw over the carrier 16 to either of two extreme positions so as to bring the driving bevel pinion 14 into correct mesh with one or other of the opposed bevel wheels 12, 13 according to the required direction of drive of the roller 10. A pair of arms 33 pivoted on a fixed transverse shaft 34 in the housing 17 are both spring-loaded upwardly by a spring 35 into engagement with the ends of the cranked portion 30 of the transverse actuating spindle 29, said arms 33 being formed each with a notch 36 which, when engaged with said cranked portion 30, locate it in the bottom dead centre or "neutral gear" position shown in Fig. 1. When said actuating spindle 29 is turned in either direction from this neutral position, so as to disengage the cranked portion 30 from said notches 36, the upwardly spring-pressed arms 33 operate to assist the turning movement and, finally, to maintain the cranked portion 30 in either of the in-gear positions to which it has been turned, so as to retain the bevel pinion 14 in correct mesh with either of the bevel wheels 13, 14.

The wringing machine is retained in any of its angular positions by a plunger 37 spring-loaded downwardly by a spring 38 and slidably mounted in top and bottom guides 39, 40 in the body of the housing 17 and in the housing flange 20 respectively, said plunger 37 being fitted with a lifting handle 41 between these guides, and its lower end engaging a hole 42 which is one of a number of locating holes in the surface 21 upon which the housing 17 turns. The upper end of this plunger 37, when its lower end is in locating engagement with one of the locating holes in said surface 21, is immediately below the carrier 16, and so long as the latter is in an in-gear position, the plunger 37 cannot be raised sufficiently to disengage its lower end from said hole, being obstructed by the carrier 16. The carrier is, however, formed with a hole 43 which registers with the top of said plunger 37 when the carrier 16 is in the "neutral gear" position shown in Fig. 1, and under that condition permits disengagement of the plunger 37 so as to enable the wringing machine to be released and swung to another angular position.

The horizontally disposed cranked actuating spindle 29 being mounted in the end bearings 28× and being independent of the locking plunger 37, is not liable to become sprained, and both its end bearing portions and its cranked centre portion 30 can be accurately ground to ensure correct meshing of the bevel gears. The provision of top and bottom bearing sleeves 23 for the bevel pinion shaft 15, in the carrier 16 and at the bottom of the depending portion 16×, thereof, enables these bearings 23 to be accurately aligned, whilst the arcuate base 27 on said depending portion 16×, whereby the carrier 16 as a whole is supported on the ring-like pressing 28 ensures easy rocking movement of the carrier 16 under the action of the cranked spindle 29. Moreover the movement of the carrier 16 into the in-gear positions is assisted by the spring-pressed arms 33, which arms also serve to maintain the bevel gears in correct mesh.

Having fully described my invention, what I claim and desire to secure by Letters Patent is:

1. In a power-driven wringing machine having one of a pair of wringing rollers driven through reversing bevel gear comprising a pair of confronting and co-axial bevel wheels drivingly coupled to said roller and an intermediate bevel pinion at the upper end of a tiltable driving shaft, said driving shaft being journalled in a driving shaft carrier which is guided in a carrier housing for tilting movement endwise of the wringing machine and means being provided for tilting said carrier so as to rock the driving shaft and bring its pinion into and out of mesh with either of said bevel wheels, the combination in said carrier tilting means of a horizontally disposed actuating spindle, bearings rockably mounting both ends of said spindle in the carrier housing, a crank portion centrally located on said actuating spindle and operatively engaged with a transverse bearing groove on the driving shaft carrier, handle means for rocking said actuating spindle, at least one horizontal rock lever engaging beneath said cranked portion of the actuating spindle, a shaft pivotally mounting said rock lever at right angles to said actuating spindle, and spring means urging said rock lever into constant engagement with the actuating spindle, said rock lever being notched so as positively to locate the cranked portion of the actuating spindle in a central position corresponding to a "neutral gear" position of said bevel pinion, and operating to maintain said cranked portion in each of its two "gear engaged" positions besides assisting movement of the actuating spindle from said central position to either of the latter positions once such movement has been initiated.

2. In a power-driven wringing machine having one of a pair of wringing rollers driven through reversing bevel gear comprising a pair of confronting and co-axial bevel wheels drivingly coupled to said roller and an intermediate bevel pinion at the upper end of a tiltable driving shaft, said driving shaft being journalled in a driving shaft carrier which is guided in a carrier housing for tilting movement endwise of the wringing machine and means being provided for tilting said carrier so as to rock the driving shaft and bring its pinion into and out of mesh with either of said bevel wheels, the combination in said carrier tilting means of a horizontally disposed actuating spindle, bearings mounting both ends of said spindle in the carrier housing, a cranked portion centrally located on said actuating spindle and operatively engaged with a transverse bearing groove on the driving shaft carrier, handle means for rocking said actuating spindle, a rock lever, spring means urging said rock lever into engagement with said actuating spindle cranked portion and said rock lever having a notch for positively locating said cranked portion in a central position corresponding to a central position of the driving shaft carrier, the driving shaft and bevel pinion with the latter out of mesh with both bevel wheels, and means for permitting rotation of said housing when said carrier is in its central position, said means comprising a housing locking plunger slidable vertically in guide holes in said carrier housing, spring means urging said locking plunger downwardly so as normally to protrude from the base of said housing, a handle on said plunger for raising it against said spring-loading to free the carrier housing for rotation, the upper end of said locking plunger being located immediately below the driving shaft carrier and the latter having a clearance hole which aligns with said locking plunger only when the carrier is in its central position, whereby the carrier housing can only be unlocked for rotation when the bevel pinion is out of mesh with both bevel wheels.

References Cited in the file of this patent

UNITED STATES PATENTS

| | | |
|---|---|---|
| 1,068,546 | Meves | Feb. 10, 1914 |
| 1,165,050 | White | Dec. 21, 1915 |
| 1,216,478 | Myrick | Feb. 20, 1917 |